US009430436B1

(12) United States Patent
Venkataraman et al.

(10) Patent No.: US 9,430,436 B1
(45) Date of Patent: Aug. 30, 2016

(54) EVENT-BASED IN-BAND HOST REGISTRATION (71) Applicant: EMC Corporation, Hopkinton, MA (US)

(72) Inventors: Srikanth Venkataraman, Karnataka (IN); Ajith Balakrishnan, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/880,731

(22) Filed: Oct. 12, 2015

Related U.S. Application Data (62) Division of application No. 13/434,087, filed on Mar. 29, 2012.

(51) Int. Cl.
G06F 15/177 (2006.01)
G06F 13/40 (2006.01)
G06F 13/42 (2006.01)
G06F 3/06 (2006.01)
G06F 13/16 (2006.01)

(52) U.S. Cl.
CPC ......... G06F 13/4022 (2013.01); G06F 3/0619 (2013.01); G06F 3/0665 (2013.01); G06F 3/0689 (2013.01); G06F 13/1642 (2013.01); G06F 13/4221 (2013.01); G06F 13/4234 (2013.01)

(58) Field of Classification Search
CPC .... G06F 3/067; G06F 11/0727; G06F 3/061; G06F 3/0635
USPC ......................................................... 709/221
See application file for complete search history.

(56) References Cited

U.S. PATENT DOCUMENTS

| 6,614,757 | B1 * | 9/2003 | Rochberger | H04L 12/5601 370/231 |
| 7,818,515 | B1 * | 10/2010 | Umbehocker | G06F 3/0605 711/114 |
| 8,122,158 | B1 | 2/2012 | Kudva et al. | |
| 8,127,059 | B1 * | 2/2012 | Carr | G06F 13/387 710/74 |
| 8,280,930 | B1 | 10/2012 | Wei et al. | |
| 2005/0033888 | A1 * | 2/2005 | Qi | G06F 3/0607 710/200 |
| 2005/0091426 | A1 * | 4/2005 | Horn | G06F 3/0613 710/33 |
| 2005/0114693 | A1 * | 5/2005 | Mimatsu | G06F 3/0607 726/2 |
| 2005/0281280 | A1 * | 12/2005 | Zur | H04L 67/1097 370/419 |
| 2006/0047907 | A1 * | 3/2006 | Shiga | G06F 3/0605 711/114 |

(Continued)

OTHER PUBLICATIONS

"EMC Powerpath Load Balancing and Failover—Comparison with native MPIO operating system solutions," Feb. 2011; EMC Corporation, accessed from http://www.emc.com/collateral/software/white-papers/h8180-powerpath-load-balancing-failover-wp.pdf on Feb. 4, 2014; pp. 5-8.

(Continued)

Primary Examiner — Anthony Mejia
(74) Attorney, Agent, or Firm — BainwoodHuang (57) ABSTRACT Techniques are presented for event-based host registration. Continuously performed standard path testing operations are able to cause an event signal upon detection of a newly-available path, and upon receiving such an event signal, a host is able to perform host registration along the newly-available path, obviating the need to periodically send out registration commands while simultaneously minimizing latency.

13 Claims, 5 Drawing Sheets

(56) References Cited

U.S. PATENT DOCUMENTS

| | | | | |
|---|---|---|---|---|
| 2008/0126615 A1* | 5/2008 | Sinclair | ............... | G06F 11/2089 710/38 |
| 2008/0127199 A1* | 5/2008 | Miki | ..................... | G06F 3/0613 718/105 |
| 2008/0301333 A1* | 12/2008 | Butler | .................. | G06F 3/0607 710/38 |
| 2010/0223404 A1* | 9/2010 | Butler | ................ | H04L 41/0806 710/38 |
| 2011/0185039 A1* | 7/2011 | Ueno | .................... | H04L 63/029 709/217 |
| 2011/0225374 A1* | 9/2011 | Kalos | ..................... | G06F 13/00 711/149 |
| 2011/0314164 A1* | 12/2011 | Alatorre | ............. | H04L 41/0816 709/227 |

OTHER PUBLICATIONS

Venkataraman, et al. ; "Event-Based in-Band Host Registration"; U.S. Appl. No. 13/434,087, filed Mar. 29, 2012.

* cited by examiner

Fig. 2

EVENT-BASED IN-BAND HOST REGISTRATION

RELATED APPLICATION

This application is a Divisional of and claims priority to U.S. patent application Ser. No. 13/434,087 filed on Mar. 29, 2012.

BACKGROUND

Data storage arrays are used to provide large amounts (e.g., 10 terabytes to 10 petabytes) of data storage to enterprises. An example of such a data storage array is a VNX® brand array produced by the EMC Corp. of Hopkinton, Mass. Often, several such data storage arrays are connected to a storage network, and storage commands are processed by a host computer also connected to the storage network. These hosts typically utilize management software to control and monitor configuration and performance. An example of such management software is the Unisphere™ software produced by the EMC Corp.

In order to ensure optimal performance, hosts must register with the data storage arrays. Typically this is done by the hosts periodically broadcasting host registration commands to the storage arrays.

SUMMARY

Although the above-described conventional systems provide beneficial functionality, short periodicities can lead to high network congestion, while long periodicities can lead to long latencies between availability of a storage array and host registration. It would be desirable to perform host registration directly upon a new storage array being detected without either the high network congestion of short periodicities or the long latencies of long periodicities.

Therefore, the present disclosure provides techniques for event-based host registration. Continuously performed standard path testing operations are able to cause an event signal upon detection of a newly-available path, and upon receiving such an event signal, the host is able to perform host registration along the newly-available path, obviating the need to periodically send out registration commands while simultaneously minimizing latency.

In one embodiment, an apparatus is disclosed. The apparatus includes (1) a plurality of host bus ports connected to a storage network for communicating with a plurality of storage bus ports of a data storage array across the storage network, (2) memory, the memory including a kernel space portion and a user space portion, and (3) a controller. The controller is configured to perform the operations of (a) executing a multipathing driver in connection with the kernel space portion, the multipathing driver being configured to manage a plurality of data paths across the storage network between the apparatus and the data storage array, (b) executing a storage management application in connection with the user space portion, (c) processing data input/output operations on the data storage array, (d) detecting, by the multipathing driver, that a data path of the plurality of data paths across the storage network between one selected host bus port of the plurality of host bus ports and one selected storage bus port of the plurality of storage bus ports has become available, (e) in response to detecting that the data path has become available, sending an event notification message from the multipathing driver to an event processing engine, the event notification message indicating that the data path is available, (f) in response to sending the event notification message, receiving a registration message from the event processing engine indicating that the selected host bus port needs to be registered with the selected storage bus port, and (g) in response to receiving the registration message, registering the selected host bus port with the selected storage bus port by sending a registration command from the storage management application to the selected storage bus port across the storage network via the selected host bus port, the registration command including registration information associated with the selected host bus port. Similar methods, systems, and computer program products are also disclosed.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Therefore, the present disclosure provides techniques for event-based host registration. Continuously performed standard path testing operations are able to cause an event signal upon detection of a newly-available path, and upon receiving such an event signal, the host is able to perform host registration along the newly-available path, obviating the need to periodically send out registration commands while simultaneously minimizing latency.

Figure 1:
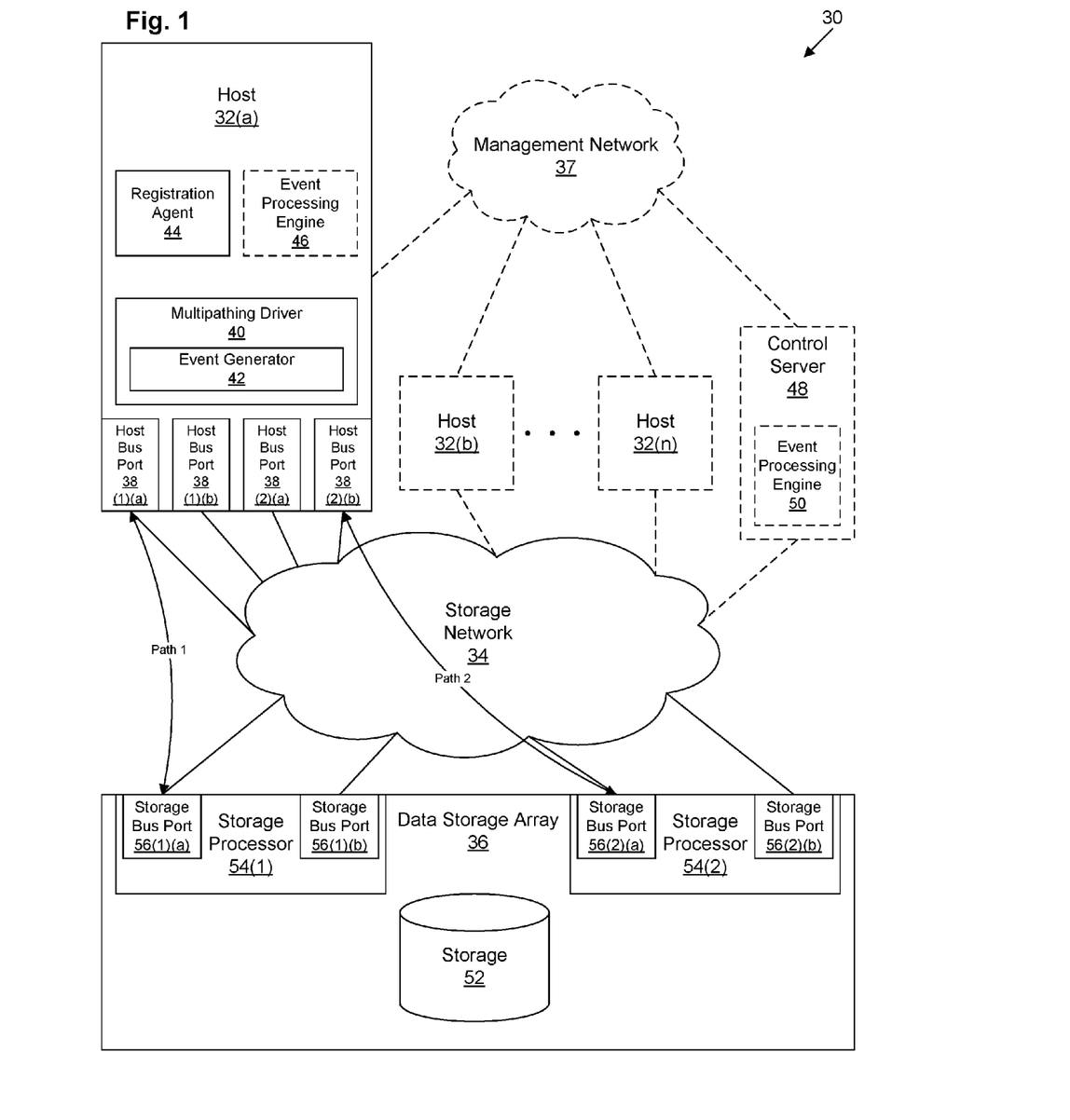
FIG. 1 illustrates an example system for use in practicing various embodiments.

FIG. 1 depicts an example system 30 for use in conjunction with various embodiments. System 30 includes host machine 32(a). Host 32(a) may be any kind of computerized device capable of processing data storage commands, such as, for example, a personal computer, a workstation, a server computer, an enterprise server computer, a desktop computer, a laptop computer, etc. Host 32(a) connects to a data storage array 36 over storage network 34. Storage network 34 is used to transmit data storage commands and associated data. Storage network 34 may be for example, a storage area network (SAN), a local area network (LAN), a wide area network (WAN), a fabric of connections and switches, etc. It may be based on Ethernet, Fibre Channel, etc.

Host 32(a) includes a set of host bus ports 38, which provide the actual connections to the storage network 34, a multipathing driver 40 for mapping data storage operations over a set of paths, and a registration agent 44, which is responsible for performing host registration. A typical host 32 includes four host bus ports 38(1)(a), 38(1)(b), 38(2)(a), 32(b)(2) arranged in pairs, although it should be understood that other numbers of host bus ports 38 are also possible. Included within multipathing driver 40 is an event generator module 42.

In some embodiments, host 32(*a*) also includes an event processing engine 46, while in other embodiments, an event processing engine 50 runs on a remote control server 48. In some embodiments, additional hosts 32(*b-n*) and control server 48 also connect to storage network 34. In some embodiments, hosts 32 communicate with each other over a separate management network 37, such as, for example, a LAN or WAN. In some embodiments, hosts 32 also communicate with control server 48 over management network 37.

Data storage array 36 includes storage 52 and storage processors 54. Storage 52 is a form of non-volatile memory for storing files and data. Storage 52 may include a plurality of data storage devices (e.g., hard disks, solid state drives, etc.) arranged in an array configuration and controlled by one or more storage processors. Storage processors 54 are devices which receive data storage commands from a host 32 and cause the commands to be performed on storage 52. A typical data storage array 36 has two storage processors 54(1), 54(2), each of which typically has two storage bus ports 56, which physically connect to storage network 34, although it should be understood that other numbers of storage processors 54 and storage bus ports 56 are also possible.

It should be understood that each host 32 may have multiple paths for data storage operations to be sent to data storage array 36. A path is a pairing between a particular host bus port 38 and a particular storage bus port 56. These paths may be logical, or they may be physical, based on switched connections of a fabric of connections and switches. Having multiple paths between the host 32 and the data storage array 36 may be useful for load-balancing between the various ports 38, 56. The availability of multiple paths may also be useful in case one or more of the various ports 38, 56 goes off-line, or if a connection gets cut, in which case, multipathing driver 40 can re-route storage operations over a different path.

Thus, for example, as depicted, Path 1 connects host bus port 38(1)(*a*) and storage bus port 56(1)(*a*), while Path 2 connects host bus port 38(2)(*b*) and storage bus port 56(2)(*a*). As depicted, there are theoretically 16 possible paths between the four host bus ports 38 and the four storage bus ports 56. A system with a different number of host bus ports 38 and storage bus ports 56 would have a different theoretical number of paths between a particular host 32 and data storage array 36. In some embodiments, multipathing driver 40 may impose a limit on the number of actual paths allowed between a host 32 and a data storage array, for example a maximum of thirty-two paths.

Figure 2:
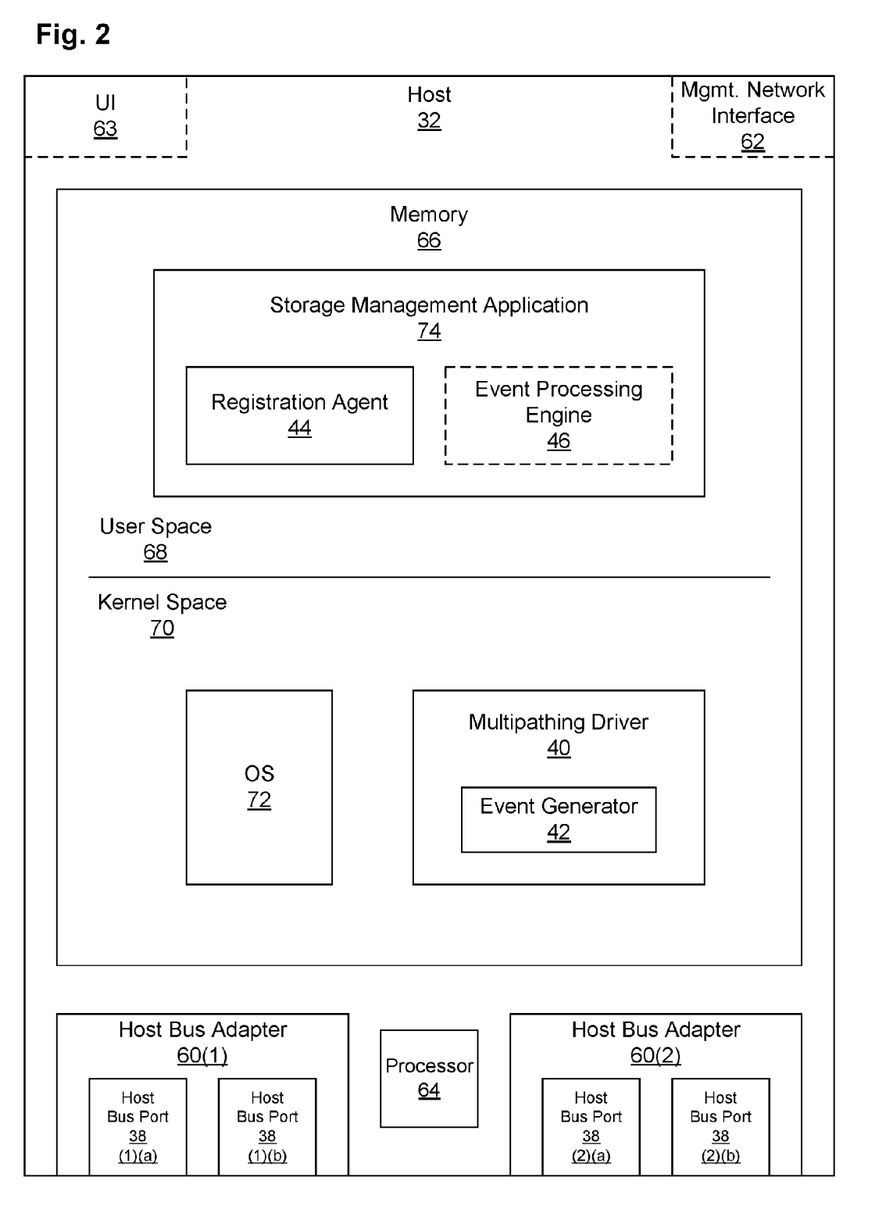
FIG. 2 illustrates an example apparatus according to various embodiments.

FIG. 2 depicts an example host 32 in more detail. Host 32 includes a set of host bus adapters 60, a processor 64, and memory 66. Host bus adapters 60 are devices which send data storage commands from the host 32 to data storage array 36. A typical host 32 has two host bus adapters 60(1), 60(2), each of which typically has two host bus ports 38 which physically connect to storage network 34, although it should be understood that other numbers of host bus adapters 60 and host bus ports 38 are also possible. Processor 64 may be, for example, a central processing unit, a microprocessor, a collection of multiple microprocessors, a digital signal processor, a field-programmable gate array, a collection of circuits configured to perform various operations, or another similar device or set of devices configured to perform operations.

Memory 66 may include, for example, system memory, cache memory, volatile memory, random access memory, some combination thereof, or another similar device or set of devices configured to store running software and/or data. Memory 66 stores executing and loaded code as well as associated data during execution by the processor 64, including an operating system 72, multipathing driver 40, additional drivers (not depicted), and storage management application 74. Storage management application 74 runs on processor 64 and in memory 66, and it includes registration agent 44, and, in some embodiments, event processing engine 46. Memory 66 has two portions—a kernel space 70, and a user space 68. Kernel space 70 is a protected area of memory, in which the OS 72 and drivers, including multipathing driver 40 (and the included event generator module 42), are stored as they run. User space 68 stores applications, such as storage management application 74 as it runs. The terms kernel space and user space are well-known in the art, and, as used in this Description, should be interpreted according to their normal well-known meaning.

In some embodiments, host 32 also includes a management network interface 62 for connecting to management network 37 and a user interface (UI) 63 for connecting to UI devices for input and output to a user.

Having described the various systems, apparatuses, and associated constructs of and used in conjunction with various embodiments, this Description will now turn to describing various method embodiments which may be performed in conjunction with the above-described systems, apparatuses, and associated constructs.

It should be understood that, within this Description, any time a piece of software is described as executing, running, operating, or performing a method, function, step, operation, etc., the method, function, step, or operation is actually performed by an appropriate processor, e.g., processor 64, while executing code of the software stored in memory e.g., memory 66.

Figure 3:
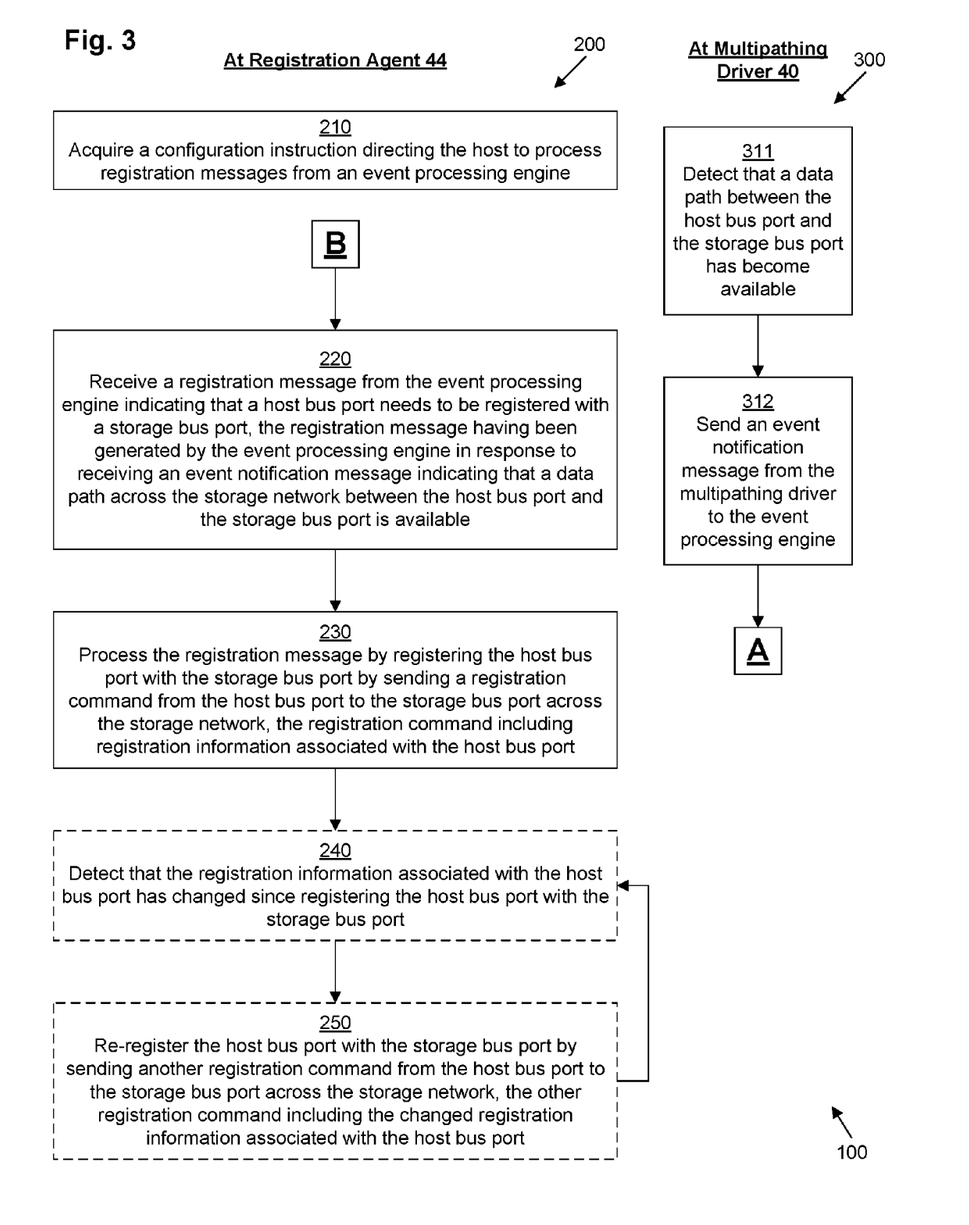
FIG. 3 illustrates example methods according to various embodiments.
Figure 4:
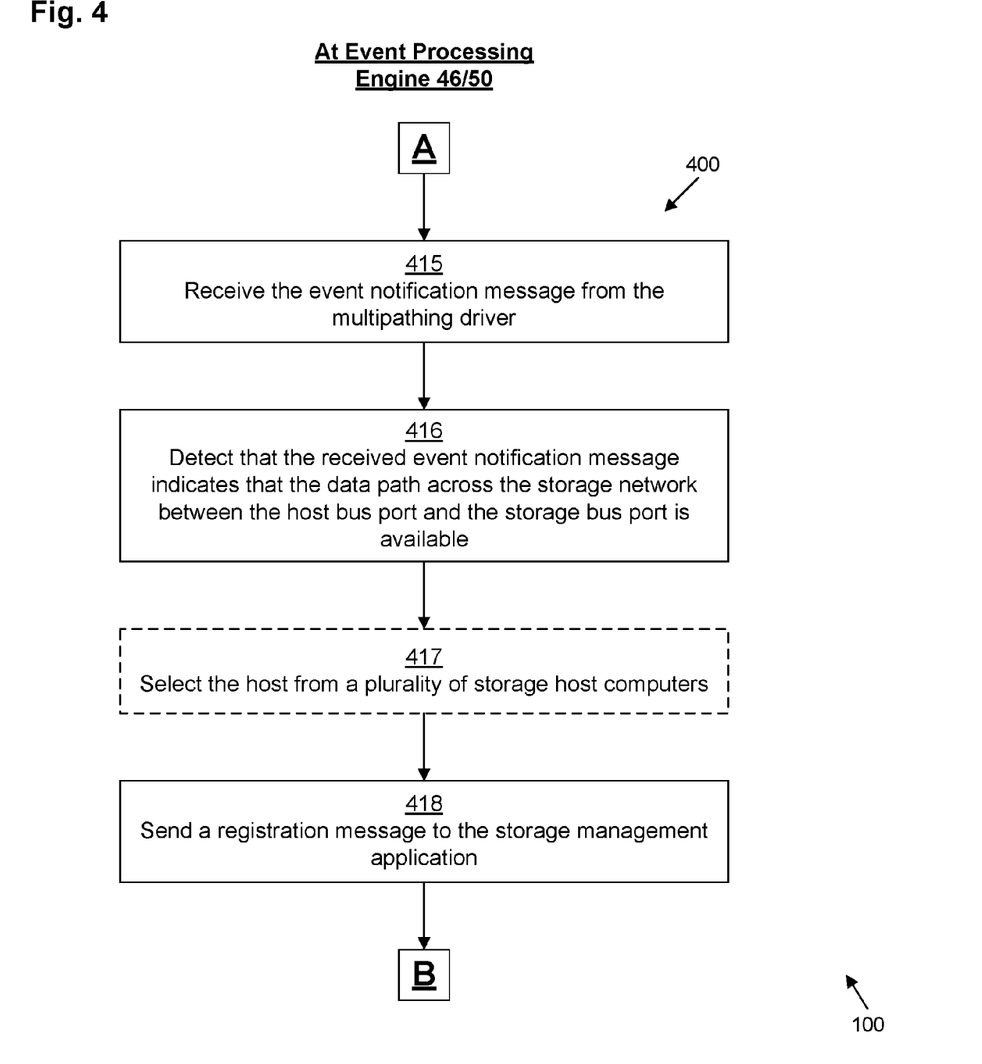
FIG. 4 illustrates example methods according to various embodiments.

FIGS. 3 and 4 depict an example method 100 performed within system 100 to effect host registration. Method 100 includes example methods 200, 300, and 400. Method 200, which is performed by registration agent 44, and method 300, which is performed by multipathing driver 40, both of which are physically performed by processor 64 on a host 32, are depicted in FIG. 3. FIG. 4 depicts method 400, which is performed by event processing engine 46 or 50.

Beginning with FIG. 3, in step 210 of method 200, registration agent 44 acquires a configuration instruction directing the host 32 to process registration messages that it receives from event processing engine 46, 50. In some embodiments, storage management application 74 acquires this configuration instruction via UI 63, when a user enters it via a UI device. In other embodiments, registration agent 44 may come pre-programmed with the configuration instruction.

The remaining steps of method 200—steps 220-230 (and, in some embodiments also steps 240-250)—are performed in response to method 400, which is performed by event processing engine 46, 50 in response to method 300 being performed by multipathing driver 40.

In step 311 of method 300, multipathing driver 40 detects that a data path between a particular host bus port 38 and a particular storage bus port 56 has become available. Typically, multipathing driver 40 continuously or periodically performs path testing over all possible paths to ensure that multipathing driver 40 has an up-to-date map of the system to allow for efficient load-balancing between paths and to ensure that storage commands and data are not lost. In some embodiments, event generator module 42 may run in the background, capturing any path that has been newly recognized, either when such path is a new path or when such path is a preexisting path that was temporarily disabled but has now become re-enabled.

In step 312 of method 300, event generator module 42 sends an event notification message from the multipathing driver 40 to the event processing engine 46, 50. In some embodiments, this message may be sent via an application interface, which connects multipathing driver 40 to event processing engine 46 running on the same host 32. In other embodiments, this message may be sent over storage network 34 or management network 37 to event processing engine 50 running on control server 48.

In response to step 312, event processing engine 46, 50 performs method 400, depicted in FIG. 4. In step 415 of method 400, event processing engine 46, 50 receives the event notification message from the multipathing driver 40. In step 416, event processing engine 46, 50 detects that the received event notification message indicates that a particular data path across storage network 34 between a particular host bus port 38 and a particular storage bus port 56 has become available.

In step 417, which is only performed by event processing engine 50 in embodiments in which it executes on control server 48, event processing engine 50 selects a particular host 32(*x*) from the set of hosts 32, based on a port number associated with the particular host bus port 38 of the newly-detected path. This design allows all event processing to be consolidated within a single server 48 that may be optimized to perform event processing. In embodiments in which event processing engine 46 executes on a host 32, step 417 would be redundant because it is already known which host 32 is associated with the particular host bus port 38 of the newly-detected path.

In step 418, event processing engine 46, 50 sends a registration message to the registration agent 44 to indicate that the particular host bus port 38 should be registered with the particular storage bus port 56. In some embodiments, this registration message may be sent via an application interface that connects event processing engine 46 running on host 32 to registration agent 44 running on the same host 32. In other embodiments, this registration message may be sent over storage network 34 or management network 37 to registration agent 44 running on host 32.

In response to step 418, registration agent 44 continues to perform method 200, depicted in FIG. 3. In step 220 of method 200, registration agent 44 receives the registration message from the event processing engine 46, 50 indicating that the particular host bus port 38 needs to be registered with the particular storage bus port 56.

In step 230, registration agent 44 processes the registration message by registering the particular host bus port 38 with the particular storage bus port 56 by sending a registration command from the particular host bus port 38 to the particular storage bus port 56 across the storage network 34, the registration command including registration information associated with the particular host bus port 38. The registration command sent from the particular host bus port 38 to the particular storage bus port 56 across the storage network 34 may be an Advanced Array Setup (AAS) SCSI command, made up of a string of Control-Tag-Length-Data (CTLD) fields. The various CTLD fields specify a name of the host 32, a unique port number (e.g., a World Wide Port Number) associated with the particular host bus port 38, and a version number of the multipathing driver 40. In some embodiments, additional CTLD fields are also used to indicate additional information, such as initiator type, interface options, device, host address, vender identifier, etc.

In some embodiments, registration agent 44 also performs additional steps 240-250. In step 240, registration agent 44 detects that registration information associated with the particular host bus port 38 has changed since registering that host bus port 38 with one or more storage bus ports 56. Step 240 may involve registration agent 44 periodically checking configuration data associated with all host bus ports 38 until a change is detected.

In step 250, upon detecting that the registration information has changed for that host bus port 38, registration agent 44 re-registers that host bus port 38 with the various storage bus ports 56 that it is connected to by a path by sending another registration command with updated registration information from the particular host bus port 38 to the particular storage bus ports 56 across the storage network 34. After performing step 250, steps 240-250 may be repeated as necessary.

Figure 5:
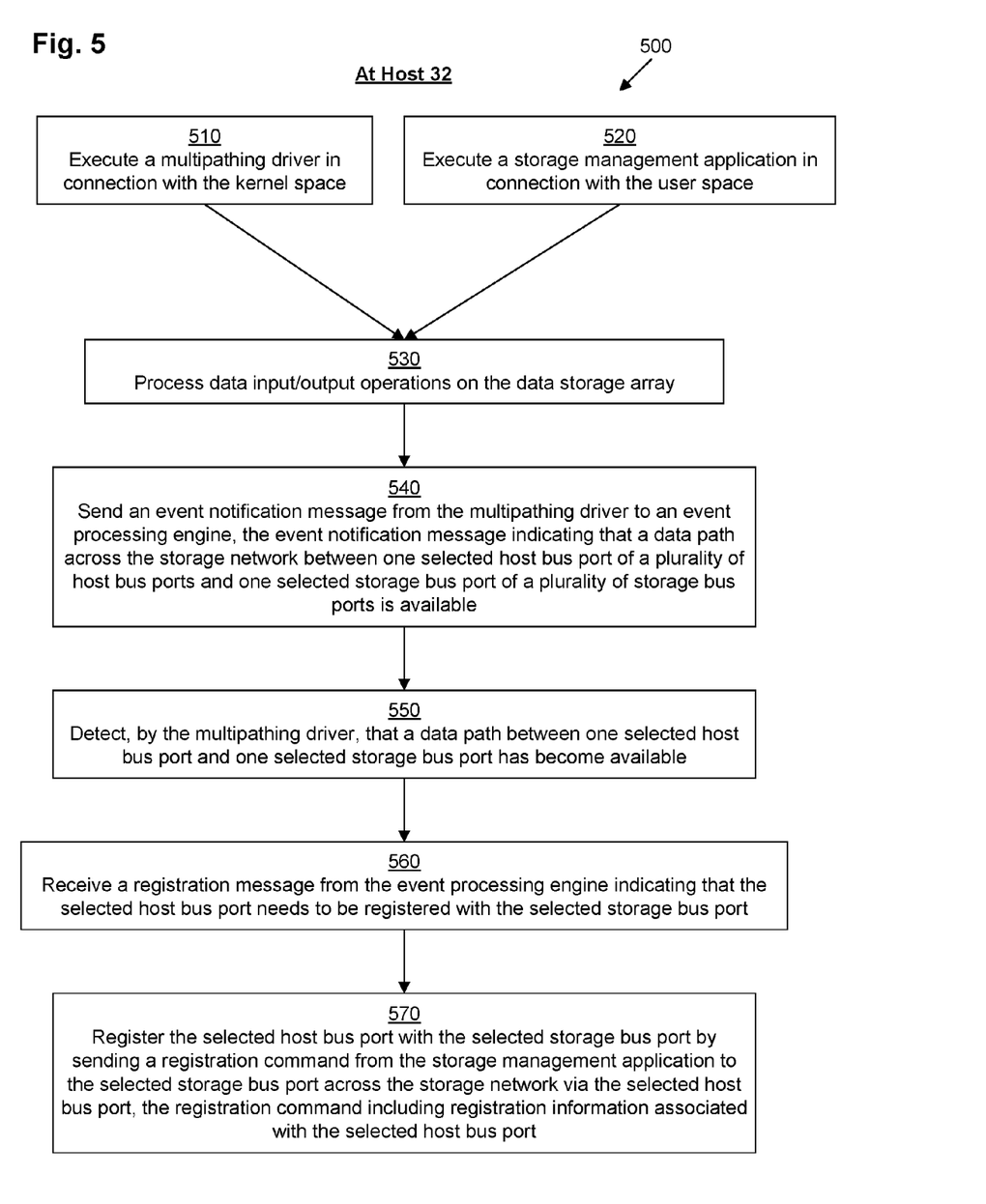
FIG. 5 illustrates an example method according to various embodiments.

FIG. 5 depicts another example method 500, which is performed by host 32. In step 510, host 32 executes multipathing driver 40 in connection with kernel space 70. In step 520, host 32 executes storage management application 74 in connection with user space 68. In step 530, host 32 processes data input/output operations on the data storage array 36. In step 540, host 32, through execution of the multipathing driver 40 (and, in some embodiments, more specifically through execution of the event generator module 42), detects that a data path across the storage network 34 between one selected host bus port 38 and one selected storage bus port 56 has become available. In step 550, in response to detecting that the data path has become available, host 32 sends an event notification message from the multipathing driver 40 to an event processing engine 46, 50, the event notification message indicating that the data path is available. At this point, event processing engine 46, 50 performs method 400, as described above in connection with FIG. 4

In step 560, in response to completion of method 400, host 32 receives a registration message from the event processing engine 46, 50 indicating that the selected host bus port 38 needs to be registered with the selected storage bus port 56. In step 570, in response to receiving the registration message, host 32, through execution of registration agent 44, registers the selected host bus port 38 with the selected storage bus port 56 by sending a registration command from the storage management application 74 to the selected storage bus port across 56 the storage network 34 via the selected host bus port 38, the registration command including registration information associated with the selected host bus port.

Thus, techniques have been described for performing event-based host registration. Event generator module 42 generates an event signal when a path becomes newly-available, in response to which event processing engine 46, 50 directs registration agent 44 to register the appropriate host bus port 38 with the appropriate storage bus port 56. This permits efficient host registration with reduced latency.

While various embodiments of the present disclosure have been particularly shown and described, it will be understood by those skilled in the art that various changes in form and details may be made therein without departing from the spirit and scope of the present disclosure as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. An apparatus comprising:
   a plurality of host bus ports connected to a storage network for communicating with a plurality of storage bus ports of a data storage array across the storage network;
   memory, the memory including a kernel space portion and a user space portion; and
   a controller, the controller being configured to perform the operations of:
      executing a multipathing driver in connection with the kernel space portion, the multipathing driver being configured to manage a plurality of data paths across the storage network between the apparatus and the data storage array;
      executing a storage management application in connection with the user space portion;
      processing data input/output operations on the data storage array;
      detecting, by the multipathing driver, that a data path of the plurality of data paths across the storage network between one selected host bus port of the plurality of host bus ports and one selected storage bus port of the plurality of storage bus ports has become available;
      in response to detecting that the data path has become available, sending an event notification message from the multipathing driver to an event processing engine, the event notification message indicating that the data path is available;
      in response to sending the event notification message, receiving a registration message from the event processing engine indicating that the selected host bus port needs to be registered with the selected storage bus port; and
      in response to receiving the registration message, registering the selected host bus port with the selected storage bus port by sending a registration command from the storage management application to the selected storage bus port across the storage network via the selected host bus port, the registration command including registration information associated with the selected host bus port.

2. The apparatus of claim 1 wherein the controller is further configured to perform the operations of:
   executing the event processing engine in connection with the user space portion;
   receiving, at the event processing engine, the event notification message from the multipathing driver via a first application interface;
   detecting, at the event processing engine, that the received event notification message indicates that the data path across the storage network between the selected host bus port and the selected storage bus port is available; and
   in response to detecting that the received event notification message indicates that the data path is available, sending the registration message from the event processing engine to the storage management application using a second application interface.

3. The apparatus of claim 2 wherein the registration information associated with the selected host bus port includes:
   a name of the host;
   a unique port number associated with the selected host bus port; and
   a version number of the multipathing driver.

4. The apparatus of claim 2 wherein the controller, when detecting that the data path has become available, is configured to detect that the data path is a new data path.

5. The apparatus of claim 2 wherein the controller, when detecting that the data path has become available, is configured to detect that the data path is a preexisting data path which has transitioned from a dead status to an alive status.

6. The apparatus of claim 2 wherein the controller is further configured to perform the operations of:
   at the storage management application, detecting that the registration information associated with the selected host bus port has changed since registering the selected host bus port at the selected storage bus port; and
   in response to detecting that the registration information associated with the selected host bus port has changed, re-registering the selected host bus port with the selected storage bus port by sending another registration command from the selected host bus port to the selected storage bus port across the storage network, the other registration command including the changed registration information associated with the selected host bus port.

7. A system comprising:
   the apparatus of claim 1; and
   a computer remote from the apparatus, the remote computer being communicatively connected to the apparatus over a network connection, the remote computer being configured to execute the event processing engine;
   wherein the remote computer is configured to perform the operations of:
      receiving, at the event processing engine, the event notification message from the multipathing driver via the network connection;
      detecting, at the event processing engine, that the received event notification message indicates that the data path across the storage network between the selected host bus port and the selected storage bus port is available;
      in response to detecting that the received event notification message indicates that the data path is available, selecting, at the event processing engine, the apparatus from a plurality of storage host computers connected to the remote computer; and
      sending the registration message over the network connection from the event processing engine to the storage management application of the selected host.

8. The system of claim 7 wherein the registration information associated with the selected host bus port includes:
- a name of the host;
- a unique port number associated with the selected host bus port; and
- a version number of the multipathing driver.

9. The system of claim 7 wherein the controller, when detecting that the data path has become available, is configured to detect that the data path is a new data path.

10. The system of claim 7 wherein the controller, when detecting that the data path has become available, is configured to detect that the data path is a preexisting data path which has transitioned from a dead status to an alive status.

11. The system of claim 7 wherein the controller is further configured to perform the operations of:
- at the storage management application, detecting that the registration information associated with the selected host bus port has changed since registering the selected host bus port at the selected storage bus port; and
- in response to detecting that the registration information associated with the selected host bus port has changed, re-registering the selected host bus port with the selected storage bus port by sending another registration command from the selected host bus port to the selected storage bus port across the storage network, the other registration command including the changed registration information associated with the selected host bus port.

12. A computer program product comprising a non-transitory computer-readable storage medium storing a set of instructions, which, when executed by a computer configured to process data input/output operations on a data storage array, cause the computer to:
- execute a multipathing driver in connection with a kernel space portion of memory of the computer, the multipathing driver being configured to manage a plurality of data paths across a storage network between the computer and a remote data storage array;
- execute a storage management application in connection with a user space portion of the memory of the computer;
- process data input/output operations on the data storage array;
- detect, by the multipathing driver, that a data path of the plurality of data paths across the storage network between one selected host bus port of a plurality of host bus ports of the computer and one selected storage bus port of a plurality of storage bus ports of the data storage array has become available;
- in response to detecting that the data path has become available, send an event notification message from the multipathing driver to an event processing engine, the event notification message indicating that the data path is available;
- in response to sending the event notification message, receive a registration message from the event processing engine indicating that the selected host bus port needs to be registered with the selected storage bus port; and
- in response to receiving the registration message, register the selected host bus port with the selected storage bus port by sending a registration command from the storage management application to the selected storage bus port across the storage network via the selected host bus port, the registration command including registration information associated with the selected host bus port.

13. A method of registering a host bus port of a host computer (host) at a storage bus port of a data storage array over a storage network, the method comprising:
- executing a multipathing driver in connection with a kernel space portion of memory of the host, the multipathing driver being configured to manage a plurality of data paths across the storage network between the host and a remote data storage array;
- executing a storage management application in connection with a user space portion of the memory of the host;
- processing data input/output operations on the data storage array;
- detecting, by the multipathing driver, that a data path of the plurality of data paths across the storage network between one selected host bus port of a plurality of host bus ports of the host and one selected storage bus port of a plurality of storage bus ports of the data storage array has become available;
- in response to detecting that the data path has become available, sending an event notification message from the multipathing driver to an event processing engine, the event notification message indicating that the data path is available;
- in response to sending the event notification message, receiving a registration message from the event processing engine indicating that the selected host bus port needs to be registered with the selected storage bus port; and
- in response to receiving the registration message, registering the selected host bus port with the selected storage bus port by sending a registration command from the storage management application to the selected storage bus port across the storage network via the selected host bus port, the registration command including registration information associated with the selected host bus port.

* * * * *